United States Patent [19]

Leyten

[11] Patent Number: 5,319,286
[45] Date of Patent: Jun. 7, 1994

[54] IGNITION SCHEME FOR A HIGH INTENSITY DISCHARGE BALLAST

[75] Inventor: Paul Leyten, Chicago, Ill.

[73] Assignee: North American Philips Corporation, New York, N.Y.

[21] Appl. No.: 968,610

[22] Filed: Oct. 29, 1992

[51] Int. Cl.⁵ ........................................... H05B 37/00
[52] U.S. Cl. ..................... 315/289; 315/224; 315/307; 315/DIG. 7; 315/290; 315/291
[58] Field of Search ............... 315/307, 289, 290, 291, 315/DIG. 7, 224

[56] References Cited

U.S. PATENT DOCUMENTS

| | | | |
|---|---|---|---|
| 3,890,537 | 6/1975 | Park et al. | 315/208 |
| 4,066,931 | 1/1978 | Morrill | 315/241 R |
| 4,382,210 | 5/1983 | Buhrer | 315/73 |
| 4,399,392 | 8/1983 | Buhrer | 315/308 |
| 4,959,593 | 9/1990 | Joanino | 315/DIG. 7 X |
| 4,994,716 | 2/1991 | Ganser et al. | 315/200 |
| 5,083,065 | 1/1992 | Sakata et al. | 315/307 |

FOREIGN PATENT DOCUMENTS 2106729 4/1983 United Kingdom .

Primary Examiner—Robert J. Pascal
Assistant Examiner—Haissa Philogene
Attorney, Agent, or Firm—Edward Blocker; Bernard Franzblau

[57] ABSTRACT

An ignition scheme for a high intensity discharge ballast. The ballast includes a down converter for producing a varying level of current during the glow stage of the lamp. The level of current available at the time of lamp ignition is equal to or greater than any other level of current produced during at least takeover of the lamp. The need for building up the level of current during at least takeover is eliminated thereby minimizing the need for re-ignition of the lamp.

36 Claims, 1 Drawing Sheet

IGNITION SCHEME FOR A HIGH INTENSITY DISCHARGE BALLAST

BACKGROUND OF THE INVENTION

This invention relates generally to a high intensity discharge (HID) lamp ballast and, more particularly, to an improved scheme for ignition of an HID ballast.

An HID lamp generally includes high pressure mercury, high pressure sodium, metal halide, high pressure metal vapor and low pressure sodium lamps. Each of these lamps is ignited through application of a high voltage pulse, nominally of several thousand volts, across the electrodes of the lamp. Following lamp ignition, the lamp enters a glow stage in which very little (i.e. a stream of) current initially flows between the electrodes of the lamp. Once the mercury, metal halides or salts serving as the plasma within the lamp has been sufficiently vaporized, the lamp enters an arc stage in which an arc rather than a stream of current continuously flows between the lamp electrodes.

The glow stage, which typically can last up to several milliseconds, includes both an unstable period and a stable period. During the unstable period (commonly referred to as "takeover"), which precedes the stable period and which begins immediately following lamp ignition, the lamp voltage drops from, for example, several thousand volts to several hundred volts. Following take over (which typically lasts for about 1-3 microseconds after lamp ignition) and for the remainder of the glow stage (i.e. the glow stage stable period), the lamp voltage alternates between several hundred volts and a much lower voltage level (e.g. about 20 volts for a metal halide type) prior to entering the arc stage.

A conventional HID ballast includes a down converter. The down converter serves as a current source for the ballast and must therefore meet the ever increasing current demands of the HID lamp during takeover and otherwise during the glow stage. The down converter increases its current output slowly and frequently is unable to meet the current demand. When the current demanded by the HID lamp during takeover or otherwise during the glow stage cannot be met, the stream of current between lamp electrodes will extinguish.

The lifetime of a HID lamp is decreased each time the lamp is ignited due to sputtering of the emissive electrode material. The sputtered, emissive electrode material eventually covers the inner lamp wall reducing lumen output and can result in flicker.

Accordingly, it is desirable to provide an HID ballast having improved ignition properties so as to minimize the need for re-ignition of the lamp during takeover and otherwise during the glow stage. In particular, the HID ballast should minimize the possibility of arc extinction due to insufficient current being available from the down converter during takeover and otherwise during the glow stage. The improved HID ballast should make it possible for the discharge lamp to more quickly enter the arc stage, increasing lamp life and maintaining for a longer period of use the nominally rated lumen output of the lamp.

SUMMARY OF THE INVENTION

Generally speaking, in accordance with the invention, a ballast for ignition of a lamp having a glow stage includes a source of power responsive to a control device for producing a varying level of current during the glow stage including a first level of current and a second level of current. The first level of current is available at the time of lamp ignition. The second level of current is produced subsequent to lamp ignition through at least termination of takeover. The control device is operable for fixing the first level of current equal to or greater than at least the second level of current and, in accordance with one feature of the invention, is operable for fixing the first level of current equal to or greater than any other level of current produced by the power source up to about 5 microseconds following lamp ignition.

The ballast in accordance with the invention therefore provides through at least takeover (i.e. at the time of lamp ignition) a level of current which can meet the current demanded by the lamp. Consequently, the stream of current produced during takeover and flowing between the electrodes of the lamp will not be subjected to extinction based on the ballast power source being unable to meet the ever increasing current demanded by the lamp. The need for re-ignition of the lamp during at least takeover is minimized thereby increasing lamp life and maintaining for a longer period of use the nominally rated lumen output of the lamp. The speed at which takeover is completed is therefore greatly enhanced in accordance with the present invention. Furthermore, by providing a first level of current at the time of lamp ignition, which is equal to or greater than any other level of current during at least takeover, it is unnecessary to slowly build up the level of current produced as required by a conventional ballast power source.

In accordance with another feature of the invention the power source includes an output at which the varying levels of current are produced. The control device is responsive to the power source output voltage for fixing the first level of current available from the power source. This power source includes a down converter having an input and an output. The down converter is adapted to serve as a current source in which a voltage produced at the output is reduced relative to the voltage received at the input.

In accordance with yet another feature of the invention, the ballast further includes a current limiter for controlling the flow of current produced by the power source prior to lamp ignition. Preferably, the current limiter and control device are connected across the power source output. In accordance with yet another feature of the invention, the control device is responsive to the voltage across the current limiter for fixing the first level of current available from the power source at the time of lamp ignition.

The control device preferably includes a switching device such as a SIDAC, and a transformer having a primary and a secondary. The switching device is responsive to the power source output voltage for controlling energization of the transformer. The voltage across the switching device and power supply output are maintained at any instant in time prior to ignition at the same magnitude. Preferably, the control device also serves as the ignitor for producing an ignition voltage for igniting the lamp upon energization of the transformer. The lamp is preferably a high intensity discharge type such as a high pressure sodium, low pressure sodium, high pressure mercury, metal halide or high pressure metal vapor lamp.

In accordance with another aspect of the invention, a method of supplying power from a power supply to a lamp during the glow stage of the lamp includes the steps of producing at least two levels of current generated by the power supply including a first level of current and a second level of current and fixing the first level of current equal to or greater than the second level of current. The first level of current is available at the time of lamp ignition. The second level of current is produced subsequent to lamp ignition through at least termination of takeover. In accordance with this aspect of the invention, the first level of current is preferably equal to or greater than other level of current during at least takeover. The first level of current is fixed based on the power supply output voltage reaching a predetermined level. An ignition pulse is produced based on the power supply reaching this predetermined level of voltage.

Accordingly, it is an object of the invention to provide an improved ballast which minimizes the need for re-ignition of an HID lamp during at least takeover and thereby increases lamp life.

It is another object of the invention to provide an improved ballast in which the level of current during at least takeover of an HID lamp need not be built up to sustain the flow of current between lamp electrodes.

Still other objects and advantages of the invention will, in part, be obvious, and will, in part, be apparent from the specification.

The invention accordingly comprises several steps and the relation of one or more of such steps with respect to each of the others, and the device embodying features of construction, combination of elements and arrangements of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENT

Figure 1:
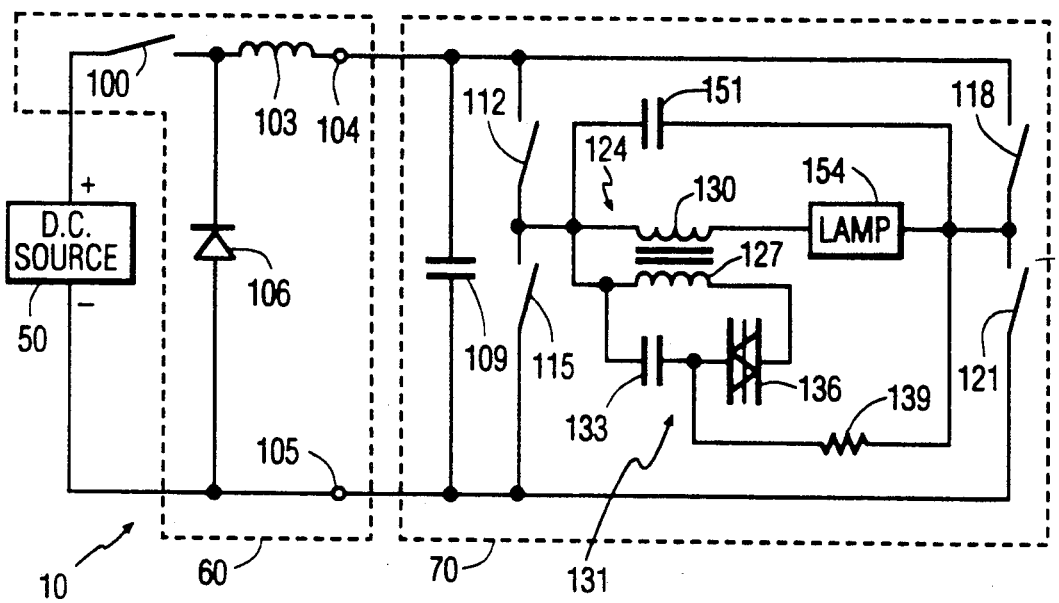
FIG. 1 is a conventional HID ballast.

An HID lamp upon ignition enters into a glow stage in which a stream of current flows between the electrodes of the lamp. As the current flow increases, the stream of current turns into an arc of current.

The glow stage includes a period of takeover during which the voltage across the lamp electrodes drops, typically from several thousand volts to several hundred volts. Takeover is considered to be the unstable portion of the glow stage. Following takeover, which generally lasts up to a few microseconds (i.e. about 1-3 microseconds), the glow stage enters a more stable period in which the voltage across the lamp (e.g. a metal halide type) alternates between several hundred volts (i.e. glow stage voltage) and approximately 10-20 volts (i.e. low arc stage voltage). At the end of the glow stage (i.e. when the lamp voltage no longer alternates between the glow stage voltage and low arc stage voltage), which can last up to from between several milliseconds and one second, the lamp is at its low arc stage magnitude. During the arc stage for a metal halide lamp, the voltage will rise from its low arc stage magnitude to the steady state operating voltage (e.g. about 100 volts for a metal halide type).

From the moment that the lamp is ignited, an increasing current demand must be provided by the ballast to achieve successful steady state operation of the lamp. Unfortunately, the ignition scheme of a conventional HID ballast requires the relatively slow build up of current by the down converter for meeting the increasing current demand of the lamp. When the current demand cannot be met, the stream/arc of current between the lamp electrodes will be extinguished. Frequently it is the stream of current during takeover which is extinguished. This inherent drawback in the ignition scheme is particularly illustrated by a conventional HID ballast 10 as shown in FIG. 1.

Ballast 10 includes a D.C. source 50, a down converter 60 and a load 70. Down converter 60 includes a switch 100, a choke 103 and a diode 106. Switch 100 is connected at one end to the positive terminal of D.C. source 50 and at its other end to one end of choke 103 and the cathode of diode 106. The other end of choke 103 is connected to an output terminal 104 of down converter 60. The anode of diode 106 is connected to an output terminal 105 of down converter 60 and to a negative terminal of D.C. source 50. Load 70 is connected across the output terminals 104 and 105 of down converter 60.

In the conventional embodiment of FIG. 1, switch 100 is closed based on a switching frequency of about 25 KHz. The duty cycle of switch 100 is varied in order to control the amount of energy stored within choke 103 and thereby varies the level of current supplied to load 70 connected across terminals 104 and 105. Down converter 60 serves as a current source in which the voltage across terminals 104 and 105 is lower than the voltage supplied to down converter 60 by D.C. source 50.

Load 70 includes a capacitor 109 which is connected across terminals 104 and 105 of down converter 60 for controlling the flow of current through choke 103 when a lamp 154 of load 70 is not ignited. Load 70 also includes a commutator having four switches 112, 115, 118 and 121. Switches 112 and 121 open and close together. Similarly, switches 115 and 118 open and close together. Control circuitry for controlling the opening and closing of switches 112, 115, 118 and 121, although not shown, is well known in the art. The commutater periodically reverses the flow of current through a winding 130 and lamp 154. In other words, switches 112, 115, 118 and 121 commutate the flow of current flowing through winding 130 so as to provide an alternating current for powering lamp 154.

Lamp 154 is a high intensity discharge lamp such as a high pressure sodium, low pressure sodium, high pressure mercury, metal halide or high pressure metal vapor lamp. In order to ignite lamp 154, a high voltage pulse typically of several thousand volts must be applied across the electrodes of lamp 154.

Ignition of lamp 154 is provided by an ignitor 131. Ignitor 131 includes a winding 127 and a SIDAC 136 which are serially connected together and in parallel with a capacitor 133. Ignitor 131 also includes a resistor 139 which is connected at one end to the junction between capacitor 133 and SIDAC 136. The other end of resistor 139 is connected to the junction between switches 118 and 121. The junction between capacitor 133 and winding 127 is connected to the junction between switches 112 and 115 and winding 124.

Prior to ignition of lamp 154, current produced by down converter 60 flows through capacitor 109. The capacitor 109 charges to a predetermined voltage level based on the switching frequency and duty cycle of switch 100. When switch 100 is open and prior to ignition of lamp load 154, current produced by choke 103 flows through capacitor 109 and returns to choke 103 through diode 106. The voltage across capacitor 109 rises until the voltage applied across SIDAC 136 is equal to the breakdown voltage of the latter. SIDAC 136 is now turned on (i.e. begins to conduct current therethrough). A voltage pulse is applied to winding 127. Winding 127 serves as the primary winding of a transformer 124. Winding 130 serves as the secondary winding of transformer 124. The voltage pulse impressed across winding 127 is transformed into a high voltage pulse across winding 130.

Winding 130 and lamp 154 are serially connected together and in parallel with a capacitor 151. The high voltage pulse across winding 130 is divided between capacitor 151 and lamp 154. The value of capacitor 151 is chosen so that substantially all of the high voltage pulse is applied to lamp 154. The high voltage pulse across lamp 154 results in ignition of lamp 154 such that lamp 154 enters its glow stage. Lamp 154 no longer appears as an open circuit to down converter 60. Accordingly, current is supplied by down converter 60 to lamp 154. The current flowing through winding 127 decreases to zero once the current flowing through SIDAC 136 drops below a fixed current level, that is, once SIDAC 136 opens (i.e. stops conducting).

In order to sustain lamp ignition during the glow stage and especially during take over, down converter 60 must meet the ever increasing current demand of lamp 154. Unfortunately, the current produced by down converter 60 is substantially zero at breakover of SIDAC 136. Down converter 60 therefore may be unable to immediately meet the current demanded by lamp 154 during takeover or otherwise during the glow stage to sustain lamp ignition.

More particularly, the voltage across SIDAC 136 prior to ignition of lamp 154 is the same as the voltage across capacitor 133. The voltage across capacitor 133 is based on the RC time constant of capacitor 133 and resistor 139. This RC time constant is sufficiently high such that capacitor 109 is substantially fully charged prior to the voltage of capacitor 133 reaching breakover of SIDAC 136. Consequently, at the time of lamp ignition, fully charged capacitor 109 substantially blocks the flow of current through choke 103. In other words, the current produced by down converter 60 at the time of lamp ignition must be built up from a substantially zero current level.

Figure 2:
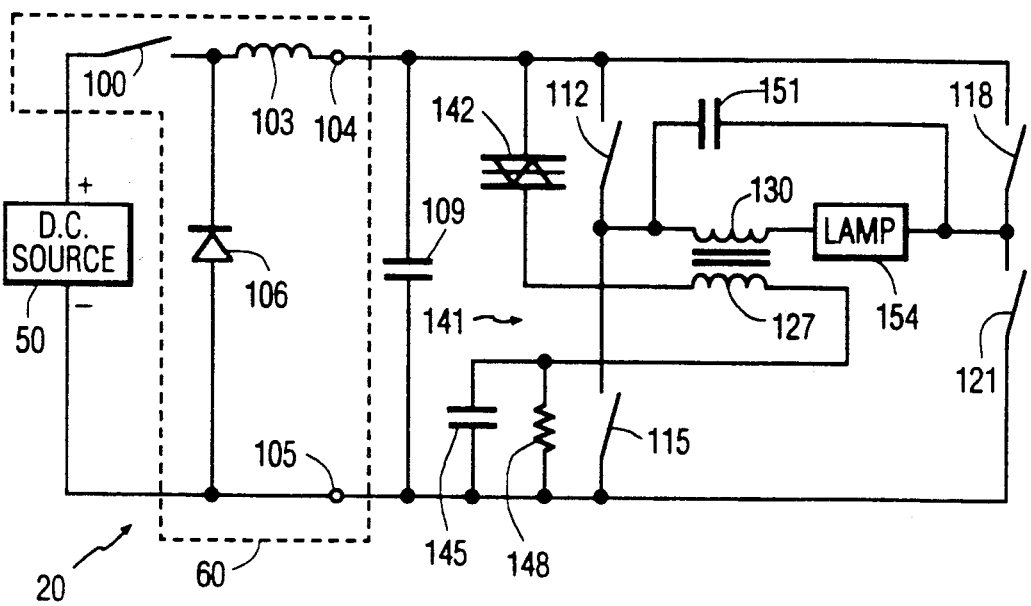
FIG. 2 is an HID ballast in accordance with the invention.

The drawbacks of ignitor 131 are substantially eliminated in accordance with the invention. More particularly, as shown in FIG. 2, a ballast 20 in accordance with the invention employs a different ignition scheme wherein during takeover and otherwise during the glow stage, down converter 60 produces a sufficiently high level of current to meet the current demand of lamp 154.

Ballast 20 includes many of the same elements as ballast 10. Those elements of ballast 20 similar in construction and operation to corresponding elements in ballast 10 have been identified by like reference numerals and will not be further addressed herein.

In accordance with the invention, ballast 20 has a very different ignition scheme compared to that of ballast 10. More particularly, ballast 20 includes an ignitor 141 which is used in place of ignitor 131 of ballast 10. Ignitor 141 includes the serial connection of a SIDAC 142, winding 127 of transformer 124 and the parallel combination of a capacitor 145 and a resistor 148. Ignitor 141 is connected across the output of down converter 60, that is, between terminals 104 and 105 of down converter 60.

As long as lamp 154 is not lit, no current flows therethrough. Thus, prior to ignition of lamp 154 and similar to ballast 10, down converter 60 charges capacitor 109. Unlike ignitor 131 of ballast 10, the voltage across SIDAC 142 prior to ignition is the same as the voltage across capacitor 109. That is the voltage across SIDAC 142 has the same voltage magnitude at the same time (i.e. synchronous magnitude) as the voltage across capacitor 109 (i.e. the voltage output of down converter 60). The voltage of SIDAC 142 instantaneously tracks (i.e. follows/adjusts) the voltage across capacitor 109. Consequently, breakover of SIDAC 142 occurs well before capacitor 109 is fully charged. Rather than requiring down converter 60 of ballast 10 to build up from a substantially zero current level at the time of ignition, current is immediately available from down converter 60 of ballast 20. In other words, the current available from down converter 60 of ballast 20 at the time of lamp ignition is equal to or greater than the current demanded by lamp 154 during at least takeover. The likelihood of the stream of current being extinguished during at least takeover is therefore significantly minimized by the ignition scheme of ballast 20. Furthermore, by requiring the voltage of SIDAC 142 be the same as the voltage across capacitor 109 prior to ignition, the length of time prior to the first commutation of lamp current is maximized. That is, the amount of energy applied to lamp 154 prior to the first commutation of lamp current is maximized. The likelihood of commutating while maintaining lamp 154 in the glow/arc stage is therefore significantly improved.

The voltage across winding 127 rapidly decreases to a value of zero following energization of winding 127. More particularly, the voltage applied to winding 127 decreases to a value of zero based on how quickly capacitor 145 charges to the same voltage level as capacitor 109 (i.e. on the RC time constant of capacitor 145 and resistor 148).

In accordance with one preferred embodiment of the invention, D.C. source 50 produces a DC voltage of 300 volts Switch 100 is a MOSFET available from International Rectifier Co. of El Segundo, Calif. as Part No. IRF 740. Choke 103 is a 2.2 millihenry inductor and capacitor 109 is nominally rated at 0.47 microfarads, 400 volts A.C. SIDAC 142 has a breakdown voltage of about 250 volts and is available from Shindengen Electric Mfg. Co., Ltd., Tokyo, Japan. Transformer 124 is a pulse ignitor transformer having a turns ratio of 2:30 with winding 130 having an inductance of 1.8 millihenries. Capacitors 145 and 151 are nominally rated at 0.1 microfarads and 0.22 microfarads, respectively. Resistor 148 has a resistance of approximately 10k ohms, 4 watts. The voltage pulse generated across winding 130 at the time of lamp ignition is approximately 3.5 kv having a pulse width of about 1.0 microseconds at 90% of its peak value. Lamp 154 is, for exemplary purposes only, a metal halide type nominally rated at 100 watts, 100 volts. Accordingly, down converter 60 at breakover of SIDAC 142 is producing a current of just under 1 ampere which is approximately the same current level drawn during steady state operation of lamp 154.

As can now can be readily appreciated, the invention minimizes the need for reignition of a high intensity discharge lamp during at least takeover and thereby increases lamp life and lumen output. In particular, the ignition scheme in accordance with the invention eliminates the need for building up the level of current available from the down converter in order to meet the current demanded by the lamp during at least takeover.

It will thus be seen that the objects set forth above, and those made apparent from the preceding description, are efficiently attained and, since certain changes may be made in the above construction without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A ballast for ignition of a lamp having a glow stage including takeover, comprising:

supply means responsive to control means for producing a varying level of current during the glow stage including a first level of current available at the time of lamp ignition and a second level of current produced subsequent to lamp ignition through at least termination of takeover; and control means for fixing the first level of current equal to or greater than at least the second level of current.

2. The ballast of claim 1, wherein the control means is operable for fixing the first level of current equal to or greater than any other level of current produced by the supply means up to at least 5 microseconds following lamp ignition.

3. The ballast of claim 1, wherein the supply means includes an output at which the varying level of current is produced and wherein the control means is responsive to the voltage across the supply means output for fixing the first level of current available from the supply means at the time of lamp ignition.

4. The ballast of claim 1, wherein the supply means includes down converter means having an input and an output, the down converter means being adapted to serve as a current source in which a voltage produced at the output is reduced relative to the voltage received at the input.

5. The ballast of claim 1, wherein the supply means includes an output at which the varying level of current is produced and wherein the control means is connected across the output of said supply means.

6. The ballast of claim 1, wherein the supply means includes an output at which the varying level of current is produced and further including current limiting means for controlling the flow of current produced by the supply means prior to lamp ignition, wherein said current limiting means is connected across the output of said supply means.

7. The ballast of claim 6, wherein the control means is responsive to the voltage across the current limiting means for fixing the first level of current available from the supply means at the time of lamp ignition.

8. The ballast of claim 1, wherein the lamp is a high intensity discharge type.

9. The ballast of claim 1, wherein the control means is further operable for producing an ignition voltage for igniting the lamp.

10. The ballast of claim 2, wherein the control means includes switching means and a transformer having a primary and a secondary, wherein said switching means and transformer primary are serially connected.

11. The ballast of claim 2, wherein the supply means includes down converter means having an input and an output, the down converter means being adapted to serve as a current source in which a voltage produced at the output is reduced relative to the voltage received at the input.

12. The ballast of claim 2, wherein the supply means includes an output at which the varying level of current is produced and further including current limiting means for controlling the flow of current produced by the supply means prior to lamp ignition, wherein said current limiting means is connected across the output of said supply means.

13. The ballast of claim 12, wherein the control means is responsive to the voltage across the current limiting means for fixing the first level of current available from the supply means at the time of lamp ignition.

14. The ballast of claim 2, wherein the control means is further operable for producing an ignition voltage for igniting the lamp.

15. The ballast of claim 3, wherein the control means is further operable for producing an ignition voltage for igniting the lamp.

16. The ballast of claim 3, further including current limiting means for controlling the flow of current produced by the supply means prior to lamp ignition, wherein said current limiting means is connected across the output of said supply means.

17. The ballast of claim 4, wherein the varying level of current produced by the supply means is provided at the output of the down converter means and further including current limiting means for controlling the flow of current produced by the supply means prior to lamp ignition, wherein said current limiting means is connected across the output of said down converter means.

18. The ballast of claim 5, wherein the control means includes switching means and a transformer having a primary and a secondary, wherein said switching means and transformer primary are serially connected.

19. The ballast of claim 18, wherein the switching means includes a SIDAC connected directly to the output of the supply means.

20. The ballast of claim 18, wherein the voltage across the switching means is the same as the voltage across the supply means output prior to lamp ignition.

21. The ballast of claim 10, wherein the voltage across the switching means and supply means output are of the same magnitude at any instant in time prior to lamp ignition.

22. The ballast of claim 18, wherein the switching means is responsive to the voltage produced at the supply means output for controlling energization of the transformer primary.

23. The ballast of claim 22, wherein the voltage across the switching means and supply means output are of the same magnitude at any instant in time prior to lamp ignition.

24. The ballast of claim 22, wherein the control means is further operable for producing an ignition voltage for igniting the lamp upon energization of the transformer primary.

25. The ballast of claim 24, wherein the voltage across the switching means and supply means output are of the same magnitude at any instant in time prior to lamp ignition.

26. The ballast of claim 10, wherein the transformer secondary is serially connected to the lamp.

27. The ballast of claim 10, wherein the supply means includes an output at which the varying level of current is produced and wherein the voltage across the switching means is the same as the voltage across the supply means output prior to lamp ignition.

28. A circuit for ignition of a lamp having a glow stage including takeover, said ignition circuit comprising:

control means coupled to an output of a supply means for producing a varying level of current including a first level of current available at the time of lamp ignition;

ignition means for fixing the first level of current equal to or greater than any other level of current produced by the supply means through at least takeover and producing an ignition voltage for igniting the lamp, said ignition means including switching means and a transformer, wherein said switching means is responsive to a voltage across the supply means output for controlling energization of said transformer; and current limiting means for controlling the flow of current produced by the supply means prior to lamp ignition.

29. The ignition circuit of claim 28, wherein said ignition means and current limiting means are connected across the supply means output.

30. A method of supplying power from a power supply to a lamp discharge, comprising:

producing at least two levels of current generated by the power supply including a first level of current available upon lamp ignition and a second level of current produced subsequent to lamp ignition through at least takeover of the lamp; and fixing the first level of current equal to or greater than the second level of current.

31. The method of claim 30, further including fixing the first level of current equal to or greater than any other level of current produced by the power supply up to at least 5 microseconds following lamp ignition.

32. The method of claim 31, further including determining the amplitude at which the first level of current is to be fixed based on the power supply output voltage reaching a predetermined level.

33. The method of claim 32, further including providing an ignition pulse to ignite the lamp based on the power supply output voltage reaching said predetermined level.

34. A ballast as claimed in claim 3 wherein a d.c. supply voltage is produced at the output of the supply means and the control means includes a voltage threshold device responsive to said supply voltage and operative to produce an ignition voltage for the lamp via inductance means coupled to said lamp.

35. A ballast as claimed in claim 1 wherein the supply means includes a switching device operated at a fixed frequency prior to lamp ignition and through the glow stage.

36. The ballast of claim 6 wherein said control means includes ignition means for fixing the first level of current equal to or greater than any other level of current produced by the supply means through at least takeover and producing an ignition voltage for igniting the lamp, said ignition means including switching means and a transformer, and wherein said switching means is responsive to a voltage across the supply means output for controlling energization of said transformer.

* * * * *